(12) United States Patent
Liu et al.

(10) Patent No.: US 7,783,702 B2
(45) Date of Patent: Aug. 24, 2010

(54) USING A MOBILE PHONE TO CONTROL A PERSONAL COMPUTER

(75) Inventors: Yunxin Liu, Beijing (CN); Qian Zhang, Kowloon (HK)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 11/290,388

(22) Filed: Nov. 30, 2005

(65) Prior Publication Data

US 2007/0124372 A1 May 31, 2007

(51) Int. Cl.
*G06F 15/16* (2006.01)
*G06F 15/137* (2006.01)
*G06F 3/00* (2006.01)
*G06F 15/177* (2006.01)
*H04K 1/00* (2006.01)

(52) U.S. Cl. .................. 709/204; 709/238; 709/201; 709/203; 709/227; 709/230; 715/733; 715/740; 380/270

(58) Field of Classification Search .................. 709/204
See application file for complete search history.

(56) References Cited

U.S. PATENT DOCUMENTS

| | | | | |
|---|---|---|---|---|
| 5,537,548 | A * | 7/1996 | Fin et al. ..................... | 709/204 |
| 5,710,922 | A * | 1/1998 | Alley et al. .................. | 707/201 |
| 5,845,282 | A * | 12/1998 | Alley et al. .................... | 707/10 |
| 5,953,399 | A * | 9/1999 | Farris et al. ............ | 379/207.15 |
| 7,269,629 | B2 | 9/2007 | Zmudzinski et al. | |
| 2002/0141549 | A1* | 10/2002 | Swanson et al. ......... | 379/88.16 |
| 2003/0204562 | A1* | 10/2003 | Hwang ....................... | 709/203 |
| 2004/0181602 | A1* | 9/2004 | Fink ........................... | 709/229 |
| 2004/0189695 | A1* | 9/2004 | Kurtz et al. .................. | 345/738 |
| 2004/0250130 | A1* | 12/2004 | Billharz et al. .............. | 713/201 |
| 2005/0021539 | A1* | 1/2005 | Short et al. .................. | 707/100 |
| 2005/0037741 | A1* | 2/2005 | Gilbert ..................... | 455/414.1 |
| 2005/0039133 | A1* | 2/2005 | Wells et al. .................. | 715/740 |
| 2005/0061336 | A1* | 3/2005 | Goetz et al. ................. | 128/899 |
| 2005/0114711 | A1* | 5/2005 | Hesselink et al. ........... | 713/201 |
| 2005/0120082 | A1* | 6/2005 | Hesselink et al. ........... | 709/203 |
| 2005/0138186 | A1* | 6/2005 | Hesselink et al. ........... | 709/229 |
| 2005/0144186 | A1* | 6/2005 | Hesselink et al. ........... | 707/101 |
| 2005/0144195 | A1* | 6/2005 | Hesselink et al. ........... | 707/201 |
| 2005/0144200 | A1* | 6/2005 | Hesselink et al. ........... | 707/204 |
| 2005/0149481 | A1* | 7/2005 | Hesselink et al. .............. | 707/1 |

(Continued)

OTHER PUBLICATIONS

Microsoft Windows XP Professional 2002 Screen Captures.*

(Continued)

*Primary Examiner*—Joseph E Avellino
*Assistant Examiner*—Patrick Nagel
(74) *Attorney, Agent, or Firm*—Lee & Hayes, PLLC

(57) ABSTRACT

Systems and methods are described for using a mobile phone to control a computing device. In one implementation, a communication protocol stack is established that includes a wireless layer, such as a BLUETOOTH wireless protocol (IEEE Standard 802.15.1) stack, a communication layer that multiplexes the wireless layer into virtual channels, and an application adaptation layer by which the mobile phone controls and previews content from each of multiple applications on the computing device. The communication protocol stack dynamically maps mobile phone keys to computer keyboard messages for controlling the applications on the computing device. A data packet structure is established for communications between the mobile phone and the computing device via the communication protocol stack.

21 Claims, 10 Drawing Sheets

U.S. PATENT DOCUMENTS

2005/0198534 A1* 9/2005 Matta et al. .............. 713/201
2005/0261031 A1* 11/2005 Seo et al. .................. 455/566
2005/0261970 A1* 11/2005 Vucina et al. ............. 705/16
2006/0035587 A1* 2/2006 Shimizu ................... 455/3.06
2006/0188096 A1 8/2006 Aguilar
2006/0223527 A1* 10/2006 Lee et al. ................. 455/432.2
2006/0248557 A1 11/2006 Stark et al.

OTHER PUBLICATIONS

Kallender, "Ubiquitous Viewer Recreates PC or Notebook Desktop or Mobile Phone's Screen", retrived at <<http://www.infoworld.com/archives/emailPrint.jsp>>, IDG News Service, Jan. 18, 2005, 2 pgs.

* cited by examiner

FILE BROWSING INTERFACE 500

MAPPING DIALOGUE MENU
700

USING A MOBILE PHONE TO CONTROL A PERSONAL COMPUTER

BACKGROUND

The number of mobile phones in use is increasing quickly and there is a fast increase in the number of functionalities available in the newer phones. For the most part, the rapid proliferation of mobile phones has followed a different path than the rapid proliferation of personal computers. Yet, besides being able to make phone calls, more and more mobile phones are "smart" phones, which can run a general purpose operating system such as MICROSOFT WINDOWS® Mobile or NOKIA SYMBIAN. These have a rich set of functionalities including e-mail, Internet access, document editing, audio, video, and even 3-D games. Current high-end mobile phones not only have strong computing capability similar to the personal computers of only a few years ago, but also support of various wireless technologies such as GPRS, CDMA1x, BLUETOOTH or even Wi-Fi.

Like personal computers, smart mobile phones have a display screen and execute many of the applications, such as email and games that a personal computer can execute, albeit in scaled down versions and accessed with a more limited keypad. If mobile phones and personal computers could interact with each other more fluently, then the rich functionalities of each device could enhance the other.

SUMMARY

Systems and methods are described for using a mobile phone to control a computing device. In one implementation, a communication protocol stack is established that includes a wireless layer, such as a BLUETOOTH wireless protocol (IEEE Standard 802.15.1) stack, a communication layer that multiplexes the wireless layer into virtual channels, and an application adaptation layer by which the mobile phone controls and previews content from each of multiple applications on the computing device. The communication protocol stack dynamically maps mobile phone keys to computer keyboard messages for controlling the applications on the computing device. A data packet structure is established for communications between the mobile phone and the computing device via the communication protocol stack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

This disclosure describes how to use a mobile phone as a smart personal controller (SPC) for a computing device, thereby mutually enhancing the functionality of both devices. By adding phone-to-computer and computer-to-phone communication capability ("interaction engine") to each device, the mobile phone becomes a remote controller for the personal computing device (i.e., the phone becomes "SPC enhanced"). But unlike dumb TV remote controllers, the SPC enhanced mobile phone provides many advanced functions for users to interact with their personal computing devices and to control their applications on the computing devices.

In one example, a presenter giving a graphics presentation to an audience at a conference, for example, using MICROSOFT POWERPOINT® presentation graphics program, can use his SPC enhanced mobile phone to control the presentation. He can wirelessly connect his SPC enhanced mobile phone to his laptop computer through BLUETOOTH wireless protocol (IEEE Standard 802.15.1) and control his presentation using a mobile phone user interface, such as the keypad, as navigation and control keys for the graphics presentation application that is running in the laptop. This enables the presenter to move away from the laptop and have more freedom to enhance the presentation by walking around. Unlike using a conventional dumb remote controller, the presenter can view the content of the current slide on his mobile phone when he is facing the audience. He is also able to preview his slides on his mobile phone to check their content before showing them to the audience. He is even able to view notes on the mobile phone to avoid forgetting critical points. This is only one example of application software on the personal computing device that can be controlled with the SPC enhanced mobile phone. The presenter can also perform operating system functions, such as browsing files on the laptop's hardrive via the mobile phone, can switch applications (and, for example, related keypad-to-keyboard mappings), and can access and control media center applications on his laptop via his phone, etc.

After introducing the architecture and key components of an exemplary SPC interaction engine that allows communication between mobile phone and personal computer, the following features are described in detail: file browsing, dynamic key mapping between mobile phone and personal computer, previewing and monitoring, and using the mobile phone as authentication for a person's identity.

Exemplary System

Figure 1:
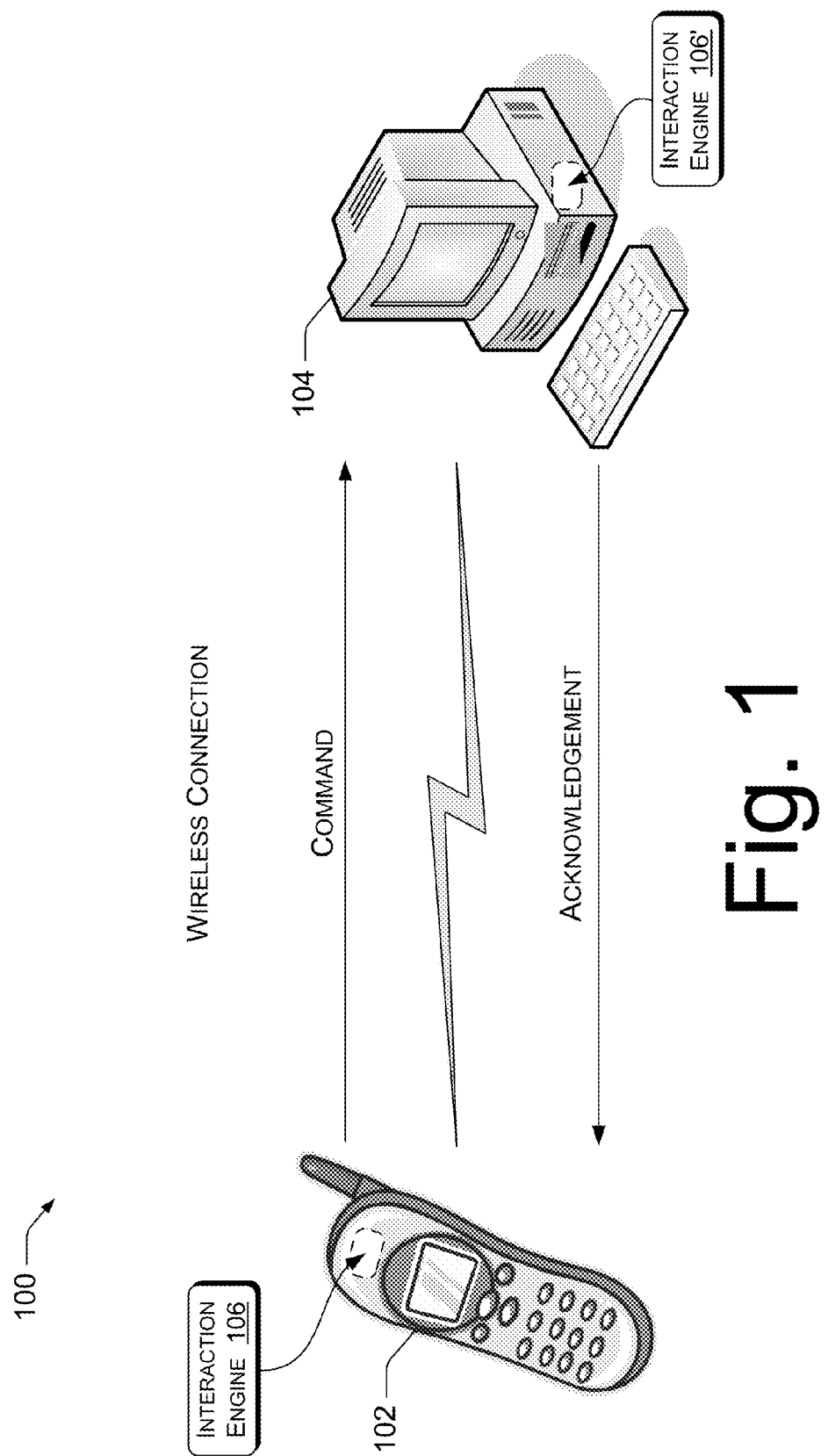
FIG. 1 is a diagram of an exemplary system for using a mobile phone to control a computing device.

FIG. 1 shows an exemplary smart personal controller (SPC) system 100 in which the strong capacity and rich connectivity of mobile phones makes it possible to use a mobile phone 102 as a smart personal controller for a computer 104. An SPC architecture (described below with respect to FIG. 2) enables users to interact with their personal computers 104 via their mobile phones 102 and to control applications on their personal computer 104 through wireless connections. To achieve this, software components are developed on both the mobile phone 102 side and the computer 104 side.

Accordingly, the mobile telephone 102 and the computer 104 include respective interaction engines 106 and 106'. (The interaction engines 106 and 106' may be slightly different from each other, as will be described below.) An interaction engine 106 allows its host device to communicate over a wireless connection to another device that has such an interaction engine 106'. The SPC architecture implemented by each interaction engine 106 enables the mobile phone 102 to issue control commands to the computer 104 via one or more of the phone's user interfaces, via a keypad, for example. The computer 104 returns an acknowledgement—of receiving the command and/or executing the command—back to the phone 102.

Figure 2:
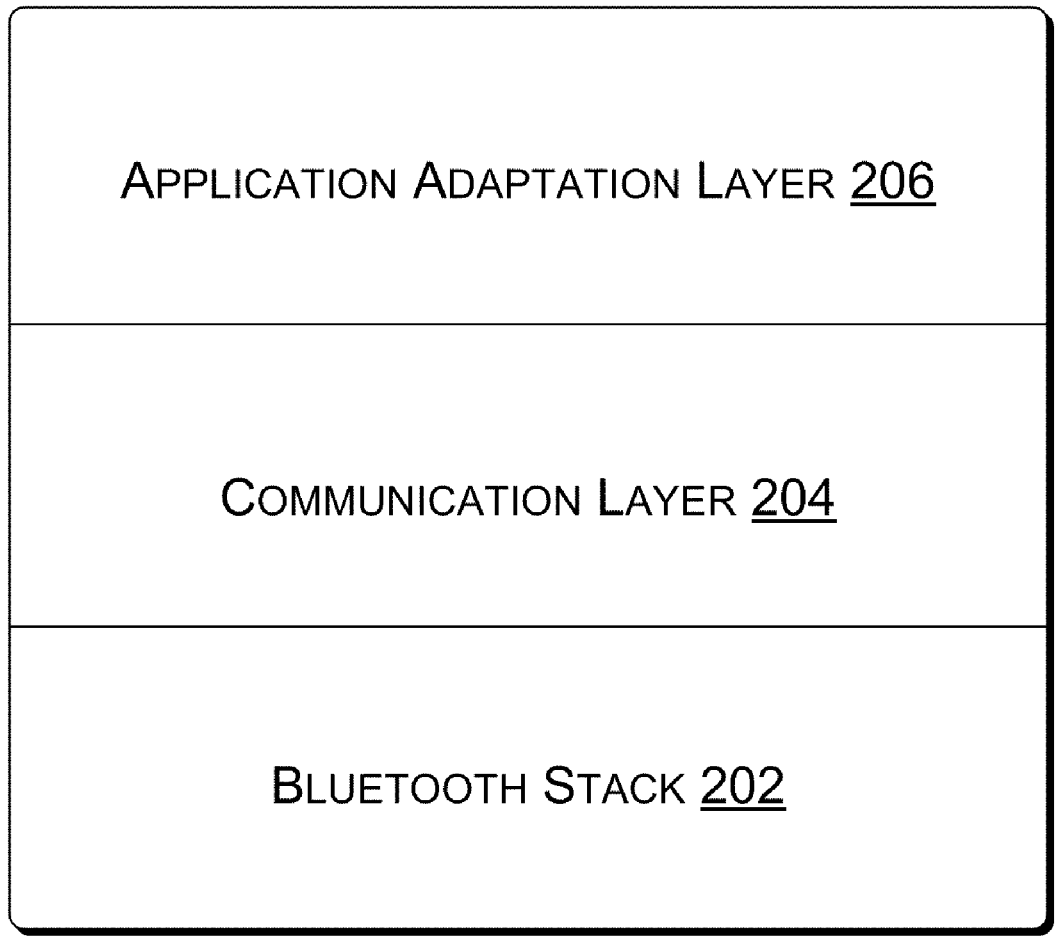
FIG. 2 is a diagram of an exemplary communication protocol stack.

FIG. 2 shows an exemplary communication protocol stack 200 comprising an SPC architecture. The communication protocol stack 200 establishes a communication protocol. The lowest layer is a physical wireless link, e.g., a BLUETOOTH wireless protocol (IEEE Standard 802.15.1) stack 202, such as the socket level BLUETOOTH wireless protocol (IEEE Standard 802.15.1) programming interface provided by MICROSOFT WINDOWS® XP and MICROSOFT WINDOWS MOBILE® (Microsoft Corporation, Redmond, Wash.).

On the top of BLUETOOTH wireless protocol (IEEE Standard 802.15.1) stack 202, a communication layer 204 performs the data-exchange related tasks. The communication layer 204 may implement multiple virtual channels, each virtual channel bound to a particular application on the computer 104 or to a particular data type for data isolation. The communication layer 204 also implements an interaction protocol between the mobile phone 102 and the computer 104.

On top of the communication layer 204, the application adaptation layer 206 defines in detail of how each application on the computer 104 will be controlled. The application adaptation layer 206 can include multiple application modules, each application module defining a set of commands and corresponding actions used to control the behavior of an application corresponding to the given application module.

By separating the communication part and the application behavior control part, the exemplary communication protocol stack 200 provides a flexible architecture for extension and scalability, and new features may be conveniently added in.

In one instance, the exemplary SPC architecture, i.e., the communication protocol stack 200, has been implemented in an environment in which the mobile phone 102 runs MICROSOFT WINDOWS MOBILE® 2003 software, the computer 104 runs MICROSOFT WINDOWS® XP operating system software, and BLUETOOTH wireless technology is used. However, the SPC architecture is not limited to these platforms. Other platforms can be used, including a mobile phone 102 running other operating systems such as SYMBIAN or embedded LINUX, and a computing device 104 running other operating systems such as LINUX or APPLE MAC OS. Other wireless technologies can be used, such as Wi-Fi, GPRS, CDMA1× or even wired technologies including USB and Ethernet.

Exemplary Engine

Figure 3:
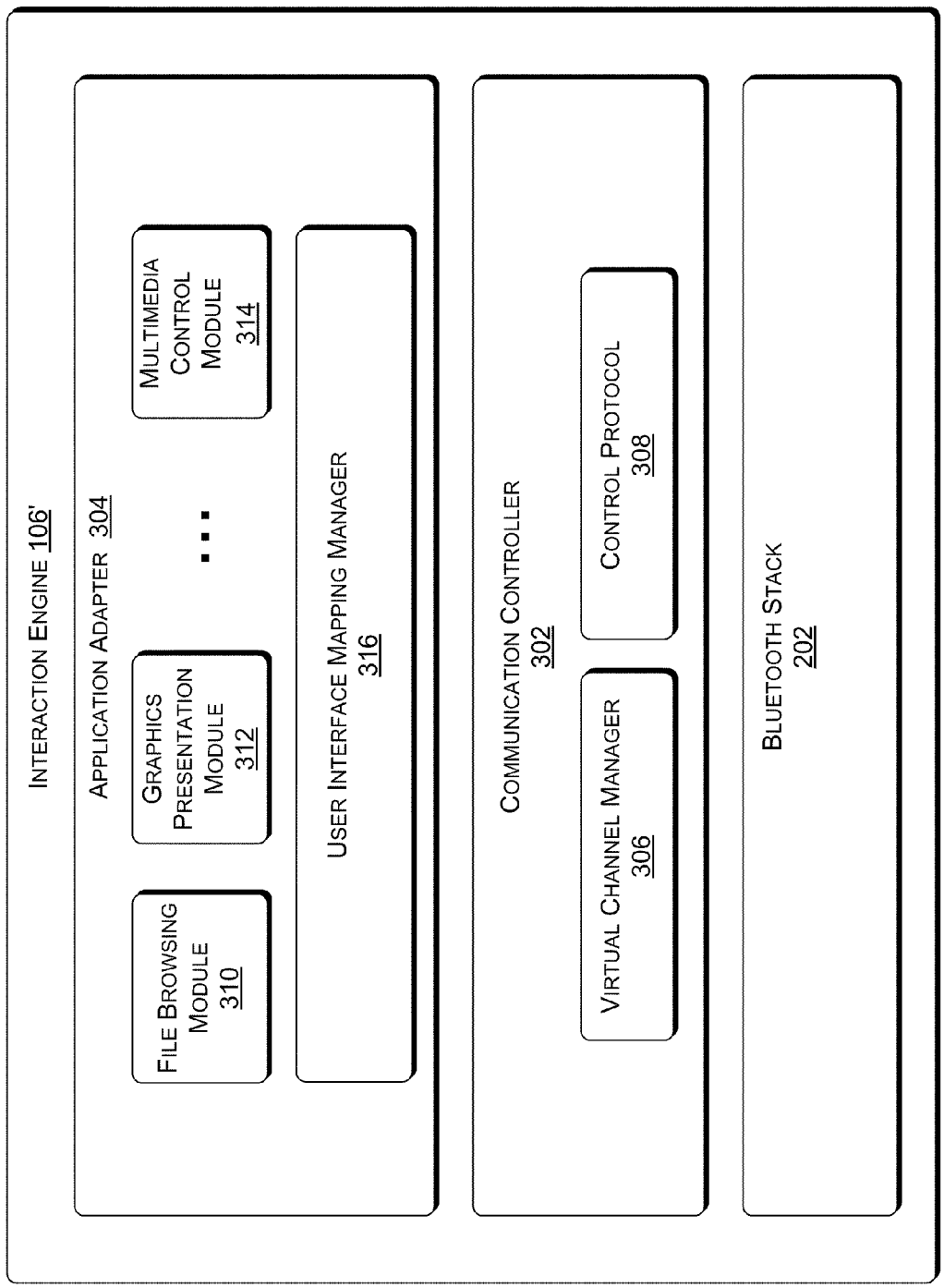
FIG. 3 is a block diagram of an exemplary interaction engine.

FIG. 3 shows the exemplary interaction engine 106 of FIG. 1, in greater detail. The illustrated configuration of the exemplary interaction engine 106 is meant to provide only one example arrangement for the sake of overview. Many other arrangements of the illustrated components, or similar components, are possible within the scope of the subject matter. Such an exemplary interaction engine 106 can be executed in combinations of hardware, software, firmware, etc.

In the shown implementation, the BLUETOOTH wireless protocol (IEEE Standard 802.15.1) stack 202 is used as the wireless link between the mobile phone 102 and the computer 104. However, other communication link platforms could be used, as just mentioned above.

The communication layer 204 is embodied in a communication controller 302, which includes a virtual channel manager 306 and a control protocol 308. The virtual channel manager 306 implements multiple virtual channels by multiplexing the underlying BLUETOOTH wireless protocol (IEEE Standard 802.15.1) connection. Each virtual channel may be bound to an individual application or data type for data isolation.

Figure 4:
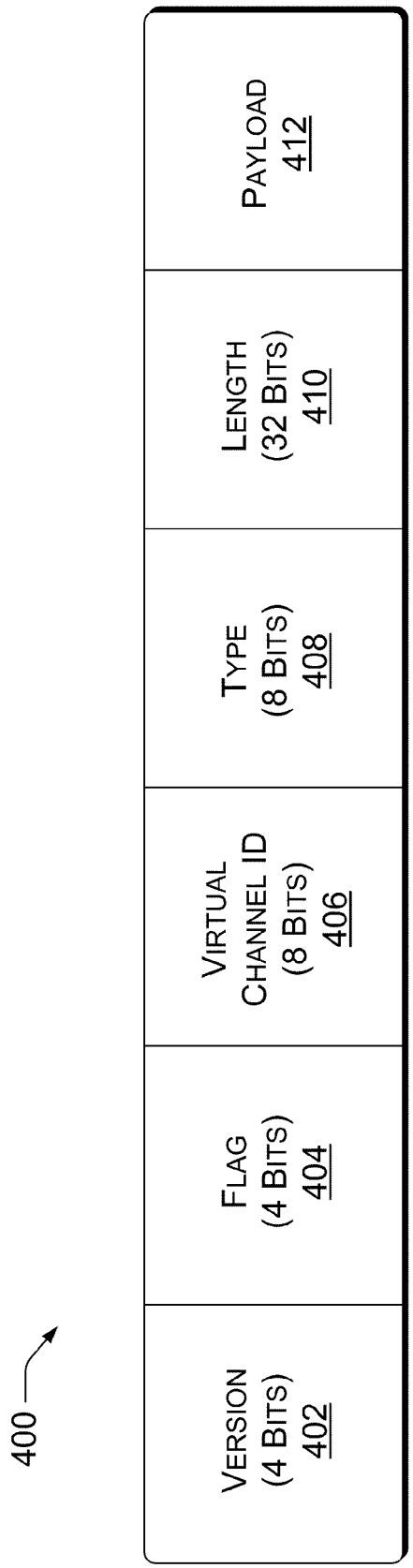
FIG. 4 is a diagram of an exemplary data packet structure.

FIG. 4 shows an exemplary packet format 400 used by the control protocol 308. That is, the control protocol 308 defines an interaction protocol between the mobile phone 102 and the computer 104, which uses the packet format 400 for data exchanges, i.e., for commands and acknowledgements.

A version field 402 (e.g., four bits) is used for version control, and in one implementation the value is zero. A flag field 404 (e.g., four bits) is reserved for signaling and toggling attributes. A default value for the flags field 404 can be zero. A virtual channel ID field 406 (e.g., eight bits) is the identity of the virtual channel in which the packet is transmitted. A type field 408 (e.g., eight bits) can be used to indicate the data type contained in the packet. A length field 410 (e.g., 32 bits) indicates the payload length of the packet. A payload field 412 (variable bits) contains the related data indicated in the length field 410. The illustrated data packet 400 is just one example of a packet format that could be used in SPC communication.

In one implementation, the packet exchange procedure is simple (as shown in FIG. 1): the mobile phone 102 sends out a command packet 400 to request that the computer 104 perform a task. The computer 104 executes the task and sends back an acknowledgement packet 400 with the execution result and related data.

Now referring back again to FIG. 3, in the illustrated implementation the application adaptation layer 206 is embodied in an application adapter 304. Working through the communication controller 302, the application adapter 304 decides details of how each application is controlled. Multiple application modules can be included in the application adapter 304, depending on the number and types of applications on the computer 104 to be controlled by the mobile phone 102.

The illustrated application adapter 304 has a file browser module 310, a graphics presentation module 312, and a multimedia control module 314. Each such application module defines a set of commands and corresponding actions used to control the behavior of the corresponding application on the computer 104. For example, the file browser module 310 may define commands, such as "open the current directory", "proceed back to the upper level directory," etc. The graphics presentation module 312 may define commands, such as "proceed to the next slide," "show the notes," etc. Each command typically has a corresponding data type defined so that the corresponding application module can determine which command is contained in a given packet 400 by parsing the type field 408 of the packet 400.

Besides the application modules (e.g., 310, 312, . . . , 314) the application adapter 304 has a user interface mapping manager 316. The user interface mapping manager 316 manages the mapping relationship(s) between one or more data input mechanisms of the mobile phone 102 and the application control messages used at the computer 104 to control a particular application, e.g., keyboard messages. The user interface mapping manager 316 may map various kinds of user interfaces on the mobile phone 102 to application control messages. The user interfaces on the mobile phone may include a combination of keypad keys, switches, a touch pad, a touch screen, a stylus pen, a stylus pad, a command interface, a camera, a speech interface, a speech reorganizing module, a mouse, a selection wheel, navigation keys, and arrow keys In one implementation, the user interface mapping manager 316 exists only on the computer side, (i.e., only in the 106' version of the engine) where the core task of the user interface mapping manager 316 is to maintain a mapping table for each application module (e.g., 310, 312, ..., 314). For example, if the user interface is a keypad, then when a key on the mobile phone 102 is pressed or otherwise actuated, the mobile phone 102 sends a packet 400 to the computer 104 to indicate which key on the mobile phone 102 was actuated. The computer 104 uses the user interface mapping manager 316 to look up the corresponding computer keyboard message and generates the proper keyboard message based on the look-up result. In one implementation, the user interface mapping manager 316 supports a dynamic mapping feature, to be discussed more fully below.

Using a Mobile Phone for File Browsing

Figure 5:
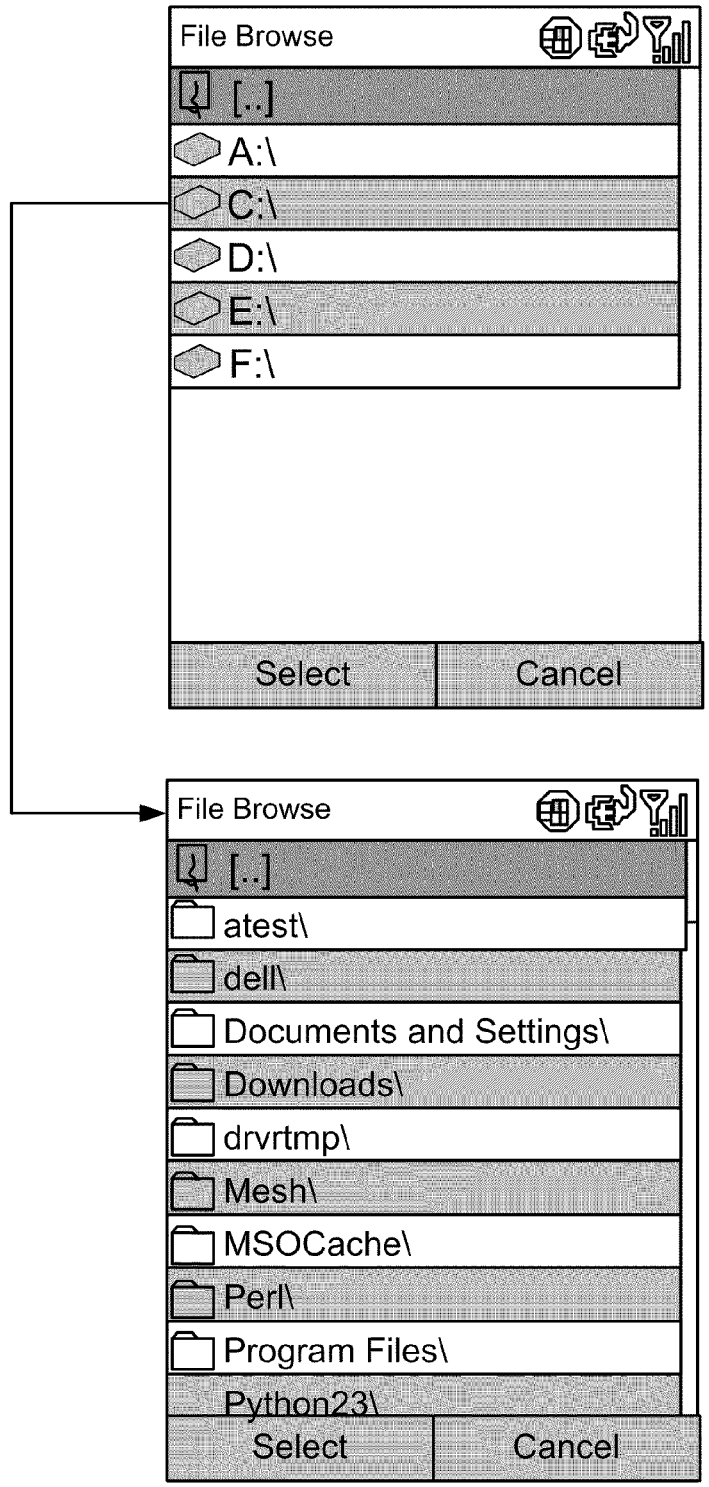
FIG. 5 is a screenshot of an exemplary file browsing interface of the mobile phone.

In one implementation of the exemplary system 100, users are able to browse files of the computer 104 on the display screen of the mobile phone 102, as if the files were local on the mobile phone 102. FIG. 5 shows a file browsing interface 500, for file browsing on the computer 104 using the mobile phone 102 as controller. The user is presented with a list of storage drives in a first user interface state 502. By selecting an icon for one of the storage drives, the user can observe the file directory structure of the selected drive in a second user interface state 504. Further, the user may also open subdirectory folders and either start an executable application or open a data file with an assigned corresponding application. For example, by designating a file with a ".ppt" extension, the file may automatically open with POWERPOINT® graphics presentation program on the computer 104; by designating a file with a ".wmv" extension, the file may automatically open with MICROSOFT MEDIA PLAYER multimedia program on the computer 104. Likewise, ".txt" files may open with a designated word processor application on the computer 104, etc. The applications summoned by the SPC enhanced mobile phone 102 run on the computer 104, not on the mobile phone 102.

Exemplary Dynamic User Interface Mapping

After starting an application, a user-definable layout allows the user to control the application at the computer 104 using the mobile phone 102. For example, using the mobile phone 102, the user can proceed back and forth between slides of a graphics presentation running on the computer 104, or operate controls of a multimedia player running on the computer 104, using the same mobile phone user interface, such as keypad, for each application.

Figure 6:
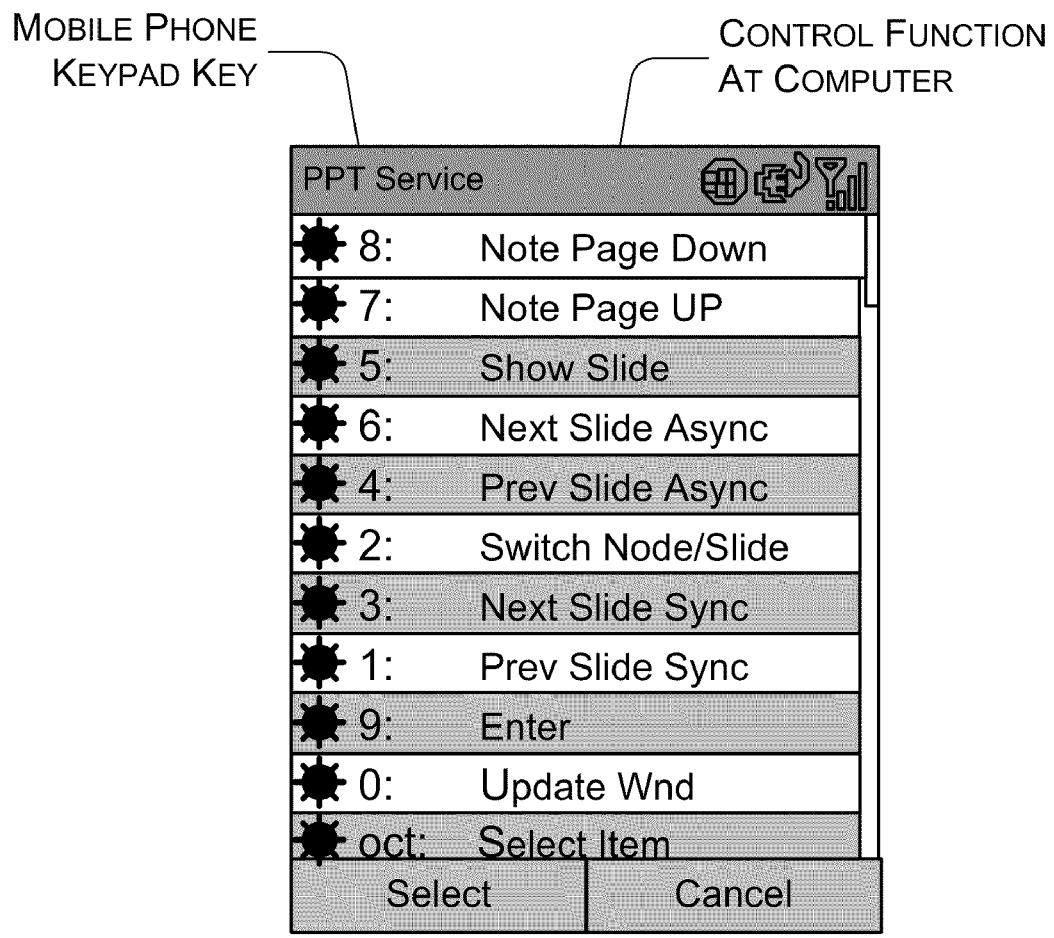
FIG. 6 is a screenshot of an exemplary help menu associating mobile phone keys to behaviors of an example application running on a computing device.

As shown in FIG. 6, one implementation of the exemplary system 100 includes a help manual 600 if the user forgets how to control a given application. The user can switch to a help mode and check, for example, the keypad layout for the current application, e.g., for a graphics presentation program.

To control an application via the mobile phone 102, the user can define which user interface elements, such as mobile phone keys, will initiate each function performed by the application. For example, the mapping of the mobile phone keypad to computer keyboard messages is user-definable. Thus, for example, the user may define that the "3" key on the mobile phone will correspond to the keyboard message "VK_NEXT" on the computer keyboard when a graphics presentation program is running on the computer 104. Thereafter, until re-defined, when the "3" key on the mobile phone 102 is actuated, a "VK_NEXT" keyboard message will be sent to the graphics presentation program on the computer 104, which will then proceed to the next graphics slide.

In one implementation, the exemplary interaction engine 106 supports dynamic user interface mapping by which the user is able to dynamically change or add mapping relationships between one of the mobile phone's user interfaces, such as keypad keys, and the computer's application control messages. "Dynamic," as used in this context, means that a new mapping takes effect immediately after the user's change. This feature is useful when users have new applications that do not yet have corresponding user-defined key mapping layouts. The dynamic user interface mapping feature is also useful when different users have different favorite keys. For example, user Alice likes to use the "3" key for the "next page" function, but user Bob likes the "5" key.

Figure 7:
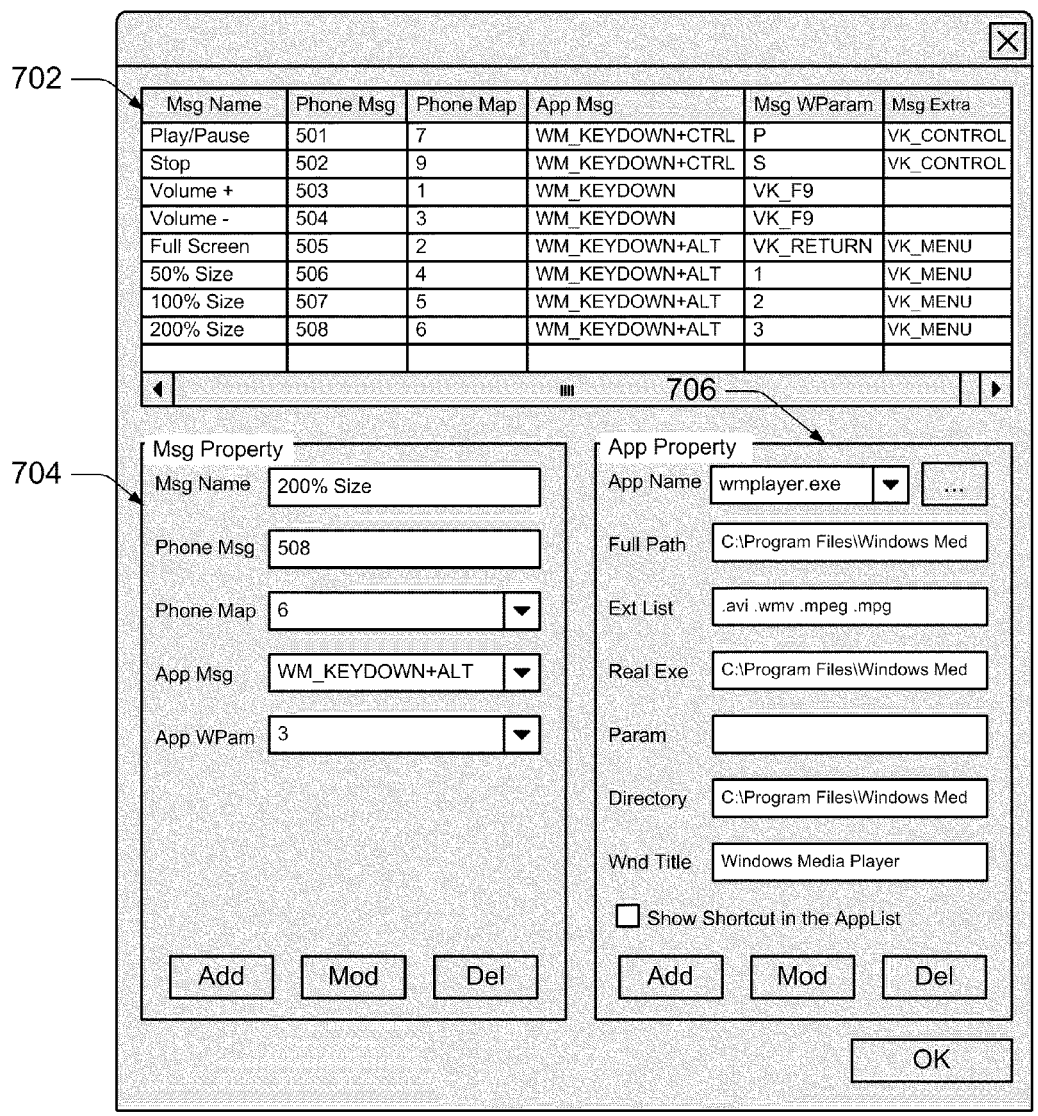
FIG. 7 is a screenshot of an exemplary key mapping dialogue menu.

The user interface mapping manager 316 supports the dynamic mapping feature using a pop-up dialogue interface, such as the exemplary key mapping dialogue menu 700 shown in FIG. 7. This allows the user to define key mapping layouts. In one implementation, a table 702 at the upper section of the dialogue menu 700 shows the currently defined keypad-to-keyboard mapping pairs. In an editing section 704 at the bottom-left of the illustrated dialogue menu 700, the user may add new key mapping pairs or modify existing key mapping pairs. The user can also provide each defined key with a user-friendly name to be displayed in the help mode describe above. In a properties section 706 at the bottom-right of the dialogue menu 700, the user indicates properties of the corresponding application, such as application name, execution path, application parameters, window title, and types of files to be opened by the application. For example, avi, .wmv, .mpeg, and .mpg files may be designated to be opened by a particular multimedia player application. After the dialogue menu 700 is closed, the configurations therein will be saved by the user interface mapping manager 316 and changes take effect immediately.

After the user interface mapping is defined by the user, or by a default, the mobile phone 102 may control applications on the computer 104 as follows. When a user interface element, such as a key, is actuated on the mobile phone 102, the mobile phone 102 sends a command packet 400 to the computer 104 to indicate which key was pressed. The computer 104, via the user interface mapping manager 316, looks up the user interface mapping table 702 based on whichever application is running, and finds the corresponding application control message. This application control message is then sent to the application, which executes the function specified.

Not all user interface elements, such as keys, actuated on the mobile phone 102 result in a command packet 400 being sent to the computer side. For example, in the case of a keypad interface, five keys may be reserved for navigation, e.g., during file browsing. The "UP" key, and "DOWN" key may be reserved for file browsing and the phone's "ACTION" key may be reserved to start applications and open files. The "LEFT" and "RIGHT" keys on the mobile phone 102 can be reserved to switch windows on the computer 104. Consequently, the SPC enhanced mobile phone 102 is able to control multiple applications. When switching from one application to another, the SPC enhanced mobile phone 102 automatically loads the corresponding key mapping table 702 so that the user may control multiple applications conveniently.

Exemplary Previewing and Monitoring Functions

Figure 8:
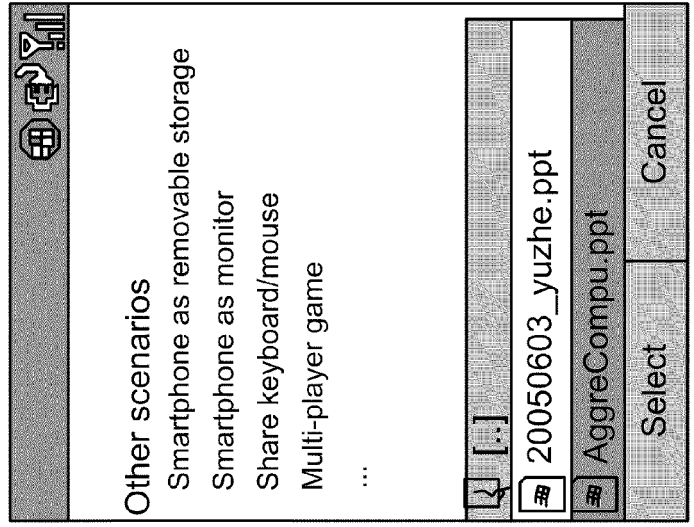
FIG. 8 is a screenshot of exemplary previewing and monitoring functions of the mobile phone.
Figure 8:
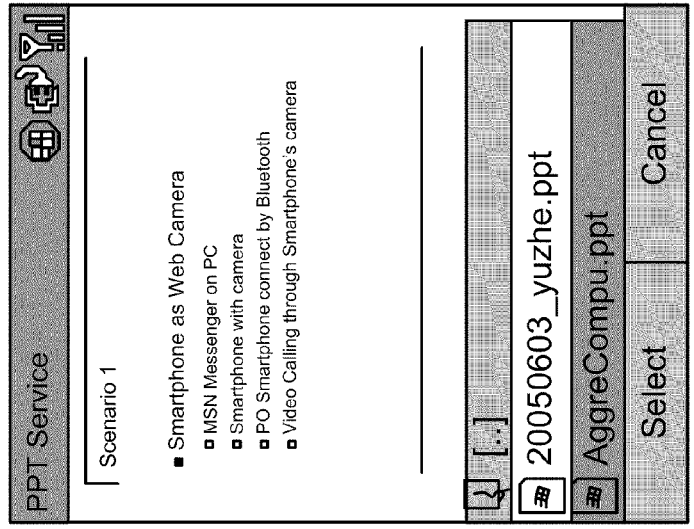

Compared to most traditional remote controllers, one of the unique features of a mobile phone 102 is that it has a display screen. The screen may be used not only for file browsing (see FIG. 5) but also for previewing and monitoring functions. As shown in FIG. 8, a user can monitor or preview slides 802 in a graphics presentation being executed by the computer 104 and monitor or preview related notes 804.

The user can also monitor or preview television channels 806 on the mobile phone 102 using multimedia software on the computer 104, for example, MICROSOFT WINDOWS® MEDIA CENTER technologies (WINDOWS® MEDIA CENTER, an application of WINDOWS® XP MEDIA CENTER EDITION, Microsoft Corporation, Redmond, Wash.). If a user is viewing, for example, a soccer game via the multimedia player software of the computer 104 and does not wish to view advertisements during the break time, the user can switch to another TV channel (or application) on the computer 104 and continue to monitor the game channel on the mobile phone 102. Similarly, the user may preview the content of other channels on the mobile phone 102 while other users view a current channel.

In general, an SPC enhanced mobile phone 102 can be used as the second display screen for the computer 104 and many useful data may be shown on the mobile phone's display screen to help users and enhance the viewing experience.

Exemplary Authentication Using a Mobile Phone

Another feature of an SPC enhanced mobile phone 102 is an ability to automatically use the mobile phone's telephone number (also known as its E.163/E.164 address) as a unique identifier for authenticating the user on the computer 104 and in computer applications. That is, a mobile phone 102 is generally owned and kept by an individual user and the unique telephone number can be used as the identifier of the individual owner. Thus, an SPC enhanced mobile phone 102 can utilize this feature for authentication and/or access control. For example, after an authentication based on the telephone number information stored in the mobile phone 102, user Alice is granted privileges to login to user Bob's computer 104 for limited access, with permission to use certain designated files, applications, and other resources.

Figure 9:
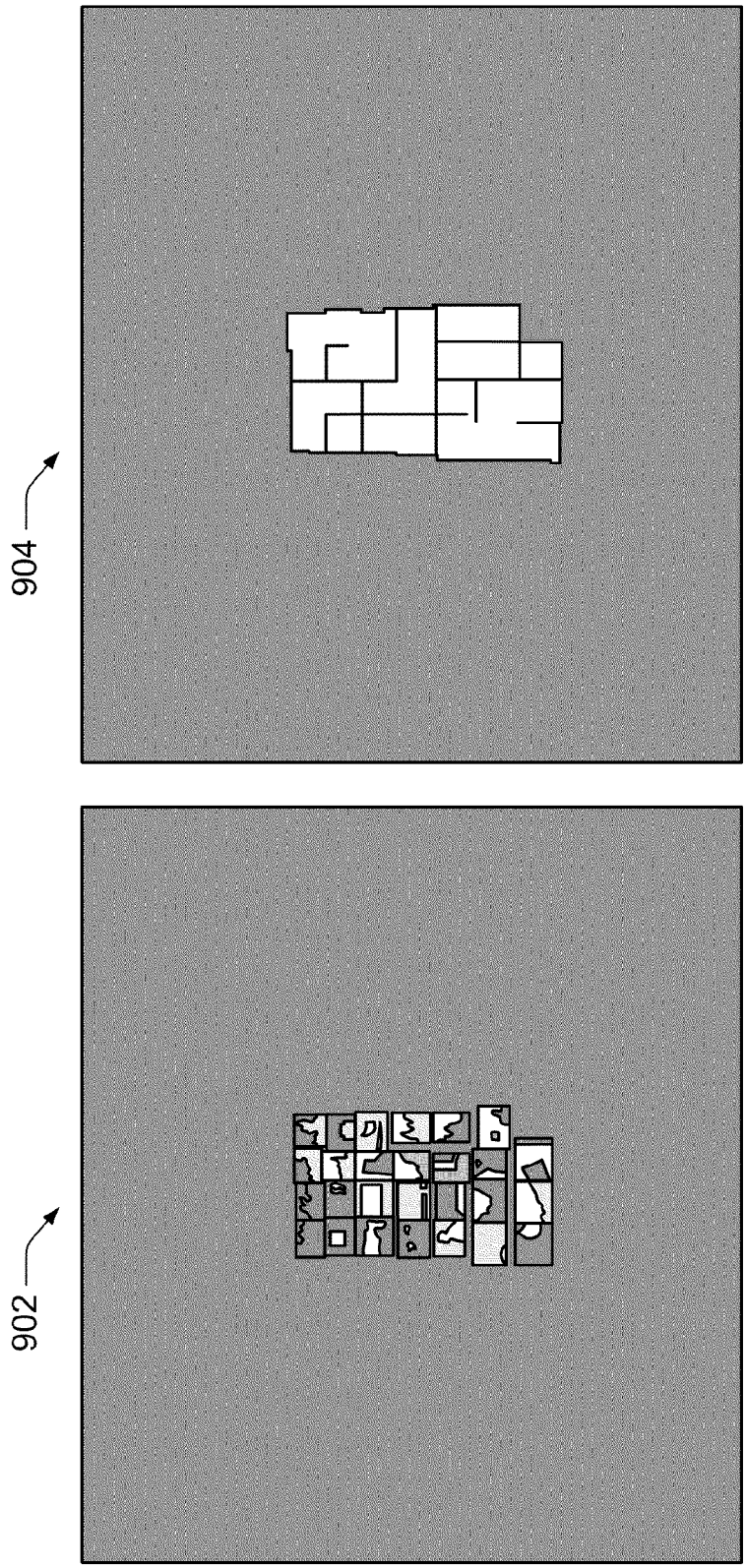
FIG. 9 is a diagram of exemplary digital rights management (DRM) using the telephone number of the mobile phone as an identity authenticator.

As shown in FIG. 9, the telephone number authentication feature can also be used for mobile digital rights management (DRM). If user Alice wants to share some photos protected by DRM with user Bob, and the photos have been copied onto Bob's computer 104, then when Alice's mobile phone is present and active, both Bob and Alice are able to view the photos 902 on Bob's computer 104 using the mobile phone 102 as controller. If Alice's mobile phone 102 is powered off or Alice leaves, however, the photos can be viewed no longer 904, either by Bob or others. Thus, when the mobile phone 102 is present and active, it provides the information for DRM to identify the user and decrypt the protected content. When the mobile phone 102 is disconnected or unavailable, then DRM protected photos or other content cannot be displayed. This DRM feature typically relies on a picture viewer that supports DRM.

Exemplary Methods

Figure 10:
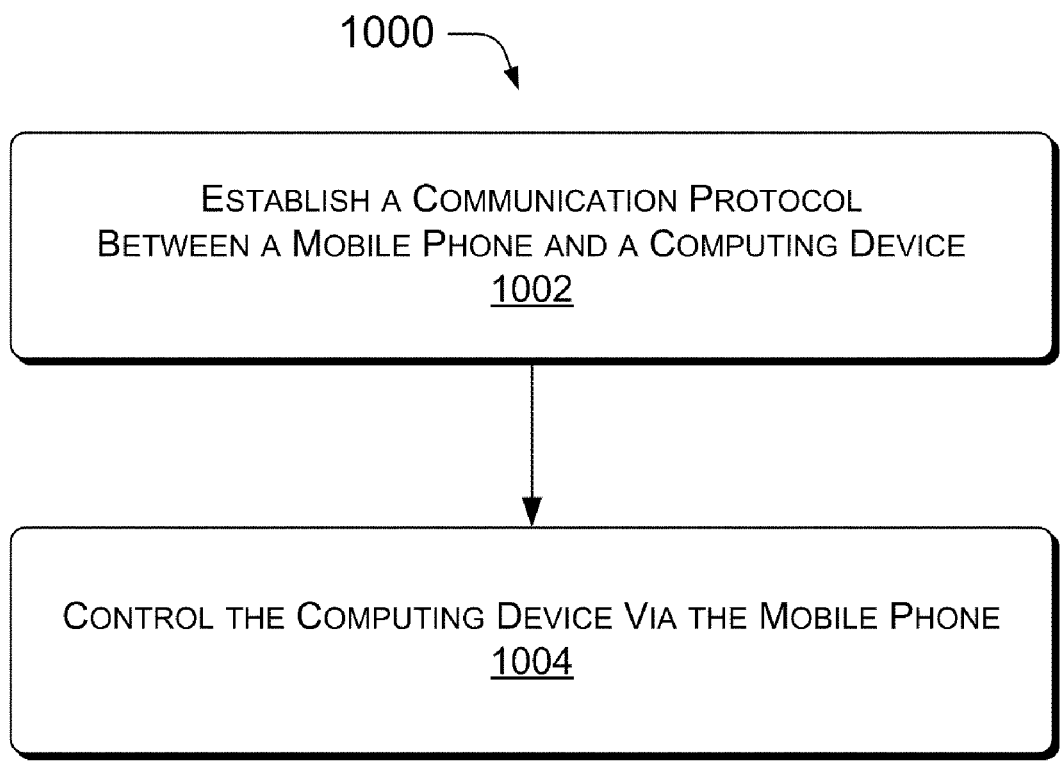
FIG. 10 is a flow diagram of an exemplary method of using a mobile phone to control a computing device.

FIG. 10 shows an exemplary method 1000 of using a mobile phone to control a computing device. In the flow diagram, the operations are summarized in individual blocks. Parts of the exemplary method 1000 may be performed by hardware, software, firmware, etc., or combinations thereof, for example, by components of the exemplary interaction engine 106'.

At block 1002, a communication protocol is established between a mobile phone and a computing device. Establishing the communication protocol may include establishing a protocol stack, including establishing a physical communication layer, such as a BLUETOOTH wireless protocol (IEEE Standard 802.15.1) stack to provide a wireless link between the mobile phone and the computing device. A communication layer is established for communicating with multiple applications on the computing device, e.g., via virtual channels created by multiplexing the BLUETOOTH wireless protocol (IEEE Standard 802.15.1) connection. An application adaptation layer is built on the communication layer to separate application behavior control from the fabric of the communication layer. This allows a flexible number of application control modules to reside in the application adaptation layer, each controlling an application on the computing device with a different set of control commands for each application. For each application to be controlled on the computing device, a mapping is made between a user interface on the phone, such as the keypad keys, and application control codes (such as keyboard messages) of the computing device. The mapping may be dynamically changed on the fly, during run-time.

At block 1004, applications on the computing device are controlled by the mobile phone. In one implementation, this involves exchanging commands and acknowledgements between the mobile phone and the computing device via data packets. In one implementation, a data packet structure is adopted that has different fields, including a payload, a length field that indicates the size of the payload, a data type field to inform an application of the data type, a flag field, a virtual channel identifier field, indicating which virtual channel to send the data packet on, etc.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods for using a mobile phone to control a personal computer. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    establishing a communication protocol between a mobile phone and a computing device;
    controlling the computing device via the mobile phone using the communication protocol, the controlling including controlling multiple applications on the computing device via a user interface of the mobile phone, the controlling further including enabling a user to dynamically define and change mapping relationships between one or more user interface elements of the mobile phone and control messages of each of the multiple applications utilizing a pop-up dialogue interface, wherein the mobile phone includes a help manual to assist the user in controlling at least one of the multiple applications on the computing device;

utilizing a phone number of the mobile phone as a unique identifier to authenticate an owner of the mobile phone on the computing device, the unique identifier further enabling the owner to share content with a user on a second computing device and enabling the owner to login to the second computing device to receive limited access to pre-designated files, applications, and other resources of the second computing device when the mobile phone is present and active; and preventing the user from accessing the shared content on the second computing device when the mobile phone is not present and active.

2. The method as recited in claim 1, wherein controlling the computing device includes browsing storage media, subdirectory structures, and individual files on the computing device via at least one user interface of the mobile phone.

3. The method as recited in claim 1, wherein controlling the computing device includes previewing image content of an application on the computing device via at least one user interface of the mobile phone.

4. The method as recited in claim 1, wherein establishing a communication protocol includes establishing a protocol stack, the establishing the protocol stack including:
   establishing a physical layer that comprises a wireless link;
   establishing a communication layer to communicate with multiple applications on the computing device via corresponding virtual channels of the communication layer; and
   establishing an application adaptation layer to control the multiple applications via the virtual channels.

5. The method as recited in claim 4, wherein establishing a communication layer includes multiplexing the wireless link to create the multiple virtual channels.

6. The method as recited in claim 4, wherein the wireless link comprises a BLUETOOTH wireless protocol (IEEE Standard 802.15.1) stack.

7. The method as recited in claim 4, wherein establishing the communication layer includes establishing a data packet structure for sending commands and acknowledgements between the mobile phone and the multiple applications on the computing device via the multiple virtual channels.

8. The method as recited in claim 7, wherein establishing a data packet structure includes establishing a packet structure that includes at least a virtual channel identifier field, a data type field, and a payload field, wherein the data type field informs at least one of the multiple applications in the computing device of a data type of data in the payload field.

9. The method as recited in claim 4, wherein establishing a communication layer includes, for each application on the computing device to be controlled by the mobile phone, dynamically mapping a user interface of the mobile phone to application control messages of the computing device.

10. The method as recited in claim 9, wherein the user interface of the mobile phone is selected from the group of user interfaces consisting of: keypad keys, a switch, a touch pad, a touch screen, a stylus pen, a stylus pad, a command interface, a camera, a speech interface, a speech reorganizing module, a mouse, a selection wheel, navigation keys, and arrow keys.

11. The method as recited in claim 1, wherein controlling the computing device via the mobile phone includes controlling an application on the computing device, the application selected from the group of applications consisting of:
   a graphics presentation application, a multimedia application, and a file browsing application.

12. The method as recited in claim 1, wherein controlling the computing device via the mobile phone includes previewing, on the mobile phone, slides of a graphics presentation program running on the computing device.

13. The method as recited in claim 1, wherein controlling the computing device via the mobile phone includes monitoring, on the mobile phone, a television channel of a multimedia application running on the computing device.

14. The method as recited in claim 1, wherein controlling the computing device via the mobile phone includes automatically authenticating a user of the mobile phone on the computing device via a phone number of the mobile phone.

15. The method as recited in claim 1, wherein controlling the computing device via the mobile phone includes managing digital rights of a content on the computing device using a telephone number of the mobile phone as permission to view the content.

16. A system, comprising:
   a computing device;
   a mobile phone communicatively coupled with the computing device;
   a communication protocol stack in each of the computing device and the mobile phone, wherein the mobile phone controls each of multiple applications on the computing device via virtual channels of the communication protocol stack, the communication protocol configured to enable a user to dynamically define and change mapping relationships between one or more user interface elements of the mobile phone and control messages of each of the multiple applications utilizing a pop-up dialogue interface,
      wherein the mobile phone includes a help manual to assist the user in controlling at least one of the multiple applications on the computing device; and
   a second computing device communicatively coupled with the mobile phone, wherein a phone number of the mobile phone is utilized as a unique identifier to authenticate an owner of the mobile phone on the computing device, the unique identifier further enabling the owner to share content with a user on the second computing device and to enable the owner to login to the second computing device to receive limited access to pre-designated files, applications, and other resources of the second computing device when the mobile phone is present and active, the user not being able to access the shared content on the second computing device when the mobile phone is not present and active.

17. The system as recited in claim 16, wherein the communication protocol stack includes at least one communication layer and an application adaptation layer, the application adaptation layer including a variable number of application control modules, each application control module to control a behavior of an application on the computing device via one of the virtual channels of the communication layer.

18. The system as recited in claim 16, wherein the communication protocol stack includes a user interface mapping manager to create, for each application to be controlled on the computing device, a mapping between a user interface of the mobile phone and application control messages of the computing device.

19. A system, comprising:

a computing device;

a mobile phone communicatively coupled with the computing device;

a communication protocol stack in each of the computing device and the mobile phone, the communication protocol stack including a physical communication layer for providing a wireless link between the mobile phone and the computing device and a communication layer for communicating control data between the computing device and the mobile phone;

an application adaptation layer included within the communication protocol stack for controlling each of multiple applications on the computing device via the control data from the mobile phone, the application adaptation layer configured to enable a user to dynamically define and change mapping relationships between one or more user interface elements of the mobile phone and control messages of each of the multiple applications utilizing a pop-up dialogue interface, wherein the mobile phone includes a help manual to assist the user in controlling at least one of the multiple applications on the computing device; and a second computing device communicatively coupled with the mobile phone, wherein a phone number of the mobile phone is utilized as a unique identifier to authenticate an owner of the mobile phone on the computing device, the unique identifier further enabling the owner to share content with a user on the second computing device and enabling the owner to login to the second computing device to receive limited access to pre-designated files, applications, and other resources of the second computing device when the mobile phone is present and active, the user not being able to access the shared content on the second computing device when the mobile phone is not present and active.

20. The method as recited in claim 8, wherein establishing a data packet structure further includes establishing:

a version field used for version control;

a flag field for signaling and toggling attributes; and a length field indicating payload length of the data packet.

21. The method as recited in claim 1, further comprising accessing a help mode of the mobile phone in response to the user requesting assistance in controlling at least one of the multiple applications on the computing device.

* * * * *